United States Patent Office 3,202,432
Patented Aug. 24, 1965

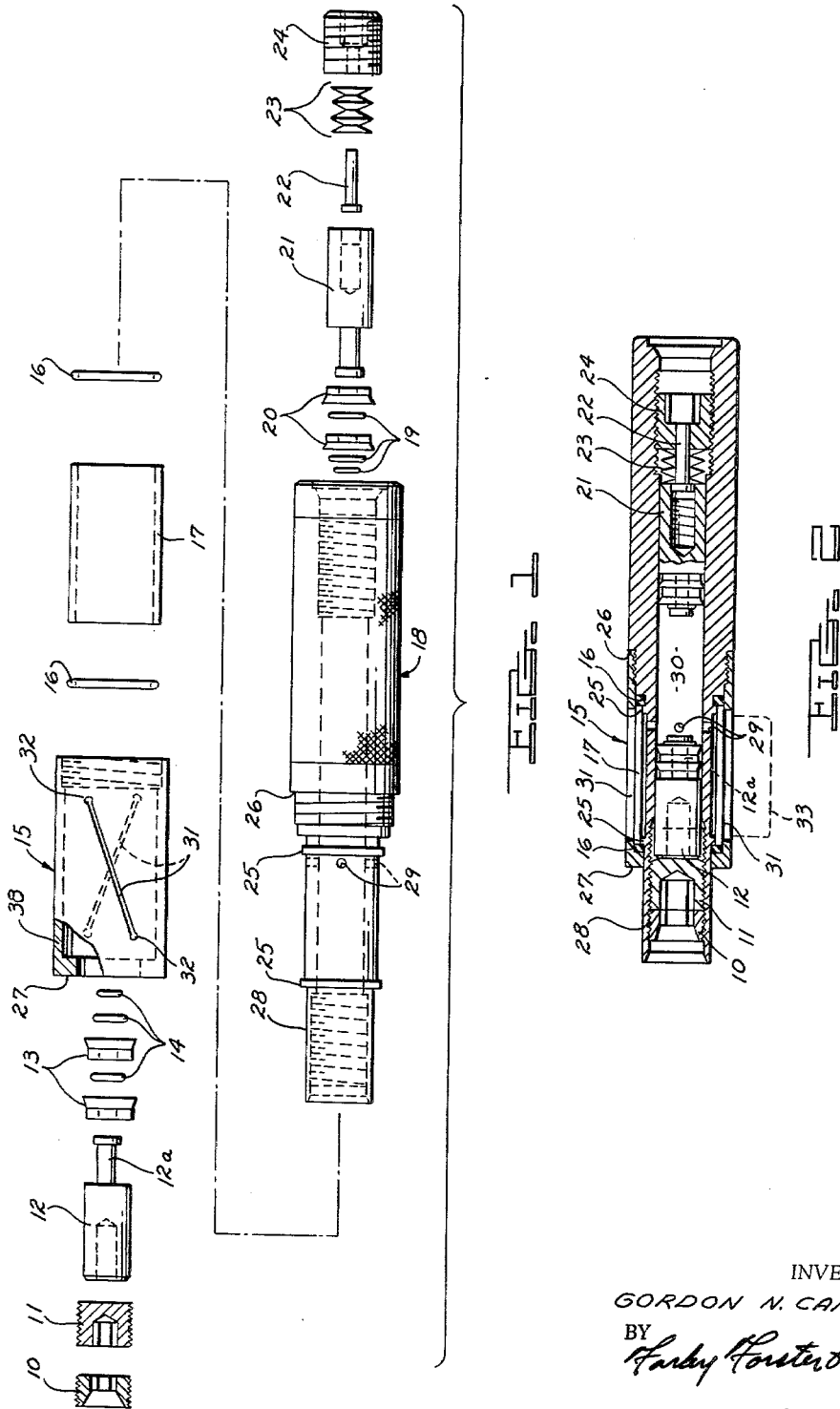

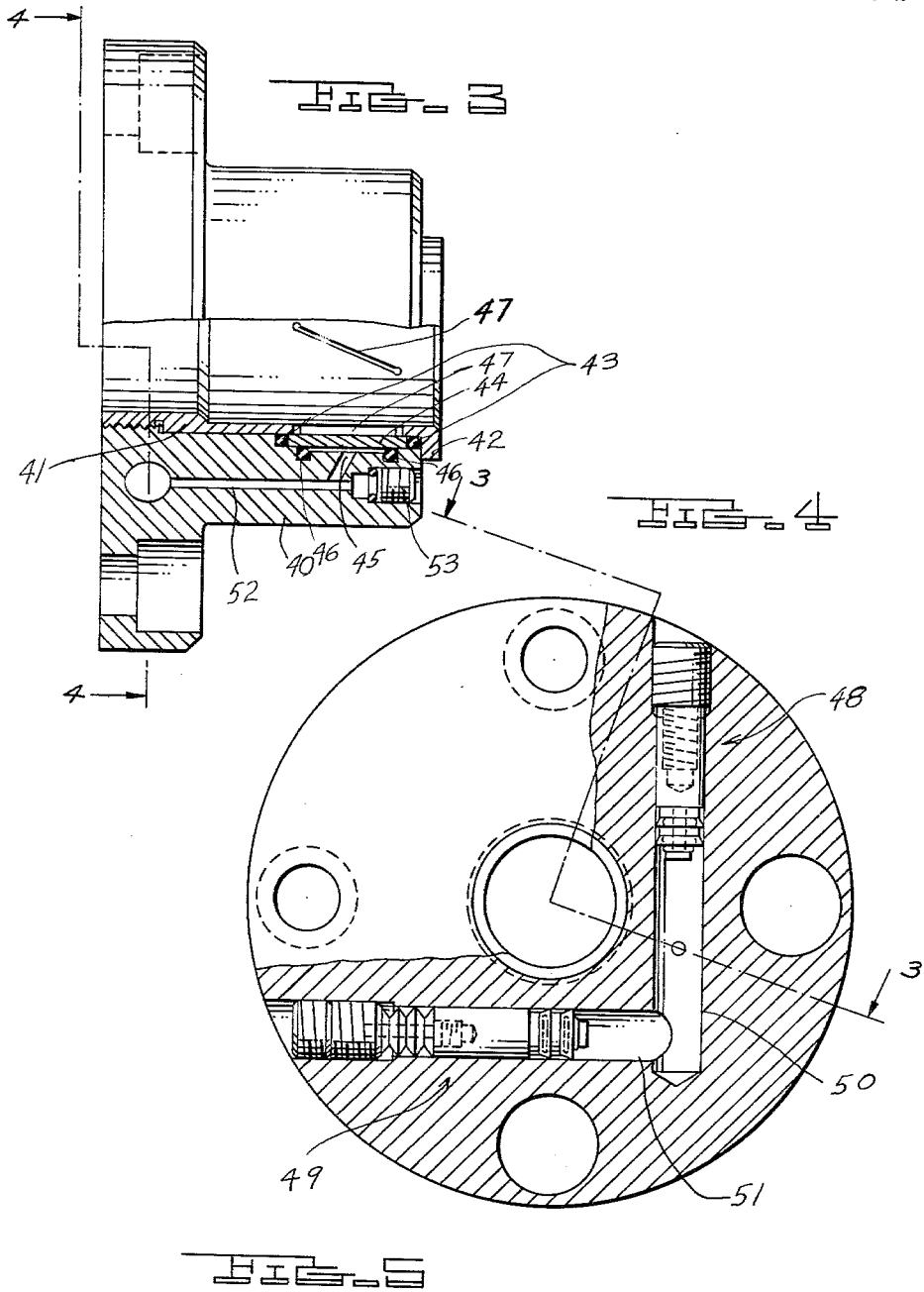

3,202,432
HYDRAULICALLY ACTUATED ARBOR AND
CHUCK CONSTRUCTION
Gordon N. Cameron, 1322 Hampton Road,
Grosse Pointe Woods 36, Mich.
Filed Mar. 7, 1963, Ser. No. 263,468
5 Claims. (Cl. 279—4)

This invention relates to hydraulically actuated arbors and chucks for accurately locating external or internal workpieces or tool elements for machining, grinding, gauging or other operations.

It is an object of the present invention to improve the accuracy, reduce the hydraulic pressure requirements and increase the range of possible actuation in this type of tool by providing a slotted, relatively heavy walled expansion shell in combination with an hydraulic sealing resilient liner. Another object is to provide a double piston construction, one of which is normally actuated to and away from a positive stop as in engaging and releasing a production run of parts, while the other is adjusted to determine and limit the engaging pressure to any desired value. Another object is to provide novel sealing means which will accommodate a relatively large expansion without loss of seal and which will minimize hydraulic fluid loss through wiping action of the seal. Another object is to provide means for maintaining a uniform holding pressure notwithstanding slight volumetric changes arising from temperature and atmospheric variations.

These and other objects will be more apparent from the following detailed description of two preferred embodiments of my invention as disclosed in the drawings wherein:

FIGURE 1 is an exploded view of the preferred hydraulic expanding arbor;

FIGURE 2 is a sectional elevation of the assembled arbor;

FIGURE 3 is a partially sectioned side elevation of a chuck constructed in accordance with the present invention;

FIGURE 4 is a partially sectioned end view taken along the line 4—4 of FIGURE 3; and FIGURE 5 is a side elevation of a modified arbor incorporating a multiple series of slots.

Referring to FIG. 1 the parts disclosed in the exploded view include from left to right a lock screw 10, adjusting screw 11, piston 12, piston rubber lip seals 13, piston rubber O ring seal supports 14, expandable slotted steel shell 15, rubber O ring sleeve seals 16, flexible material inner sleeve 17, main steel arbor body 18, seal supports 19, piston seals 20, piston 21, spring retainer 22, steel disc springs 23 and actuating screw 24.

Referring to the assembled arbor shown in FIG. 2 it will be seen that the inner sleeve 17, preferably a relatively flexible strong plastic material such as nylon, is internally supported at either end by arbor body shoulders 25 and that the O ring sleeve seals 16 are compressed against the ends of the inner sleeve 17 by the threaded engagement of the steel shell 15 to a tight position against the shoulder 26 of the arbor body. A close fit between the shouldered end 27 and a pilot extension 28 of the arbor body provides a rigid relationship between the arbor body and the shell when the latter is tightened firmly against the shoulder 26.

Hydraulic pressure conducted through apertures 29 from the cylindrical interior 30 of the arbor body provides an expanding force on the nylon inner sleeve which is in turn transmitted to the shell 15 which has a plurality of slots 31, preferably no fewer than three and preferably extending diagonally and terminating at ends 32 just beyond the margin of any part or tool element 33 to be mounted on the arbor. Such slotted construction permits the shell to be formed with a relatively heavy wall section 38 providing much greater rigidity and accuracy of location than possible with a thin walled unslotted construction, while at the same time permitting relatively lighter hydraulic actuating pressure. The diagonal slots are preferred to axially extending slots because they result in a better bearing for the part and a longer effective slot per inch of axial length. In typical commercial units which have given highly satisfactory results in production use, a shell wall thickness in the order of .045 to .060 inch and 1/32 inch width slots with spacing ranging from 1/2 inch to 1 1/2 inches on the perimeter, or a minimum of three slots on small arbors have been employed with a nylon inner sleeve of comparable thickness.

The piston rubber lip seals 13 and O ring seals supports 14 are preassembled on the piston stem 12a before insertion in the cylinder chamber 30 of the arbor, the seal supports 14 serving to expand the lip seals into firm sealing engagement with the cylinder wall assuring a tight seal against leakage even when all hydraulic pressure is released. It will be apparent that hydraulic pressure may be created within the cylinder 30 by actuation of either the adjusting screw 11 or the actuating screw 24, the latter acting through steel disc springs 23 stacked on the spring retainer 22 the head of which is pressed into the cylindrical aperture at one end of the piston 21.

In preparing the arbor for use the lock screw 10 is loosened, the lock screw 10 and adjusting screw 11 are backed out to a release position and the actuating screw 24 is turned in to the end of the threads which provide a positive stop. The adjusting screw 11 is then turned in to establish sufficient hydraulic fluid displacement to expand the slotted steel shell to a predetermined diameter sufficient to assure tight engagement of the part or tool element to be held thereon but short of any possibility of permanent distortion or damage to the shell in the absence of a restraining part or tool element thereon (or as an alternative the adjustment may be made with a master part or tool element in place on the arbor until a predetermined torque resistance to rotation is reached) whereupon in either case the lock screw is tightened and the actuating screw is thereafter alone used for engaging and releasing the part or tool element on the arbor. The disc springs 23 are chosen with a rate appropriate to the pressure required which, for example, may be on the order of thirty-five pounds of force to compress the discs through half of their linear displacement. The discs when thus compressed serve to maintain a substantially uniform pressure and gripping force on the part or tool element notwithstanding temperature variations tending to create volumetric changes which might otherwise modify the hydraulic pressure. The disc springs may also be employed to limit the actuating pressure of any automatic actuating rod which may be employed to actuate the arbor in lieu of the actuating screw 24 with the end of the arbor or some other element operating as a positive stop.

The assembled arbor is finish ground with the shell 15 tightly screwed against the shoulder 26 so as to assure concentricity of the expandable shell surface with the main arbor body. In this connection it is preferred to perform a limited area crown grinding operation corresponding approximately to the central one-half of the slotted portion with sufficient hydraulic pressure established to expand the shell in the order of .005 inch so that upon relaxing pressure the slotted shell will contract to a slightly concave condition assuring that when a cylindrical part is placed on the arbor the initial expansion will effect an initial engagement and alignment at axially spaced portions of the part with the final engaging pressure expanding the central portion of the shell into a firm cylindrical gripping condition. Such construction has been found to produce a much more consistently accurate alignment and coaxial relationship of the part and arbor than would result where the arbor is finish ground without expanding pressure so that initial contact is established at the center crown of the shell upon expansion permitting the part to be slightly cocked as the full engagement pressure is applied.

As shown in FIG. 5, two or more series of slots may be employed in the arbor, where a relatively long part or tool element is to be held, in preference to a single series of longer slots since the plural series will result in greater rigidity and accuracy of location through axially spaced engagement.

Referring to FIGS. 3 and 4, it will be seen that the same principles of hydraulic actuation and pressure control have been adapted to the chuck construction. Thus a main chuck body 40 rigidly supports an inner steel shell 41 screwed tightly therein to produce firm engagement of the shoulder 42 with the chuck body and to compress O ring seals 43 against the ends of the relatively flexible inner sleeve 44 radially compressable through fluid pressure in the passage 45 sealed by O rings 46 to produce contraction of the shell in the area of the diagonal slots 47. Actuating and adjusting piston assemblies 48 and 49, similar to those employed in the arbor, control the actuating pressure in the intersecting cylinder passages 50–51 communicating through a lead passage 52 with the passage 45, a sealing plug 53 being provided at the end of the passage 52.

While particular preferred embodiments of both arbor and chuck constructions have been disclosed and described above in detail it will be understood that numerous modifications may be resorted to without departing from the scope of the invention as defined in the following claims.

I claim:
1. A holder of the class described comprising a holder body, a deflectable slotted shell mounted on said body, a sleeve constructed of relatively more flexible material covering the slotted portions of said shell, means defining a sealed fluid chamber on a side of said sleeve remote from said shell, said means including O ring seals compressed against the ends of said sleeve, and means for establishing hydraulic pressure in said chamber for actuating said sleeve and shell to a holding position.

2. A holder of the class described comprising a holder body, a deflectable slotted shell mounted on said body, a sleeve constructed of relatively more flexible material covering the slotted portions of said shell, means defining a sealed fluid chamber on a side of said sleeve remote from said shell, and means for establishing hydraulic pressure in said chamber for actuating said sleeve and shell to a holding position, said last means including cylinder means, an actuating piston, and an adjusting piston.

3. A holder of the class described comprising a holder body, a deflectable slotted shell mounted on said body, a sleeve constructed of relatively more flexible material covering the slotted portions of said shell, means defining a sealed fluid chamber on a side of said sleeve remote from said shell, and means for establishing hydraulic pressure in said chamber for actuating said sleeve and shell to a holding position, said last means including cylinder means, an actuating piston, and an adjusting piston, a positive stop being provided for limiting the travel of said actuating piston.

4. A holder of the class described comprising a holder body, a deflectable slotted shell mounted on said body, a sleeve constructed of relatively more flexible material covering the slotted portions of said shell, means defining a sealed fluid chamber on a side of said sleeve remote from said shell, and means for establishing hydraulic pressure in said chamber for actuating said sleeve and shell to a holding position, said shell being provided with a true cylindrical surface when actuated to said holding position.

5. A holder of the class described comprising a holder body, a deflectable slotted shell mounted on said body, a sleeve constructed of relatively more flexible material covering the slotted portions of said shell, means defining a sealed fluid chamber on a side of said sleeve remote from said shell, and means for establishing hydraulic pressure in said chamber for actuating said sleeve and shell to a holding postion, said shell having a plurality of diagonally extending slots adapted to provide radial flexibility.

References Cited by the Examiner
UNITED STATES PATENTS

| | | | |
|---|---|---|---|
| 2,621,867 | 12/32 | Grettve | 279—4 |
| 2,711,863 | 6/55 | Grettve | 279—4 |
| 2,833,545 | 5/58 | Smrekar | 279—47 |
| 2,920,895 | 1/60 | Krouse | 279—4 |
| 2,971,765 | 2/61 | Atherholt | 279—4 |
| 3,025,072 | 3/62 | Cahill | 279—4 |

ROBERT C. RIORDON, *Primary Examiner.*

FRANK SUSKO, *Examiner.*